(12) United States Patent
Lee et al.

(10) Patent No.: US 7,168,176 B2
(45) Date of Patent: Jan. 30, 2007

(54) GEOMAGNETIC SENSOR FOR INFORMING USERS WHETHER DETECTED AZIMUTH ANGLE IS ACCEPTABLE, AND A METHOD THEREOF

(75) Inventors: Woo-jong Lee, Gyeonggi-do (KR); Sang-on Choi, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/067,208

(22) Filed: Feb. 28, 2005

(65) Prior Publication Data

US 2005/0188556 A1    Sep. 1, 2005

(30) Foreign Application Priority Data

Feb. 26, 2004    (KR) ...................... 10-2004-0013068

(51) Int. Cl.
G01C 17/38    (2006.01)
(52) U.S. Cl. .............................. 33/356; 33/357; 33/361
(58) Field of Classification Search ............. 33/355 R, 33/356, 357, 361, 362; 701/93, 224; 702/92, 702/93; 73/1.76; 324/225, 247, 253, 254, 324/255, 260
See application file for complete search history.

(56) References Cited

U.S. PATENT DOCUMENTS

| | | | |
|---|---|---|---|
| 4,611,293 A * | 9/1986 | Hatch et al. ................... | 702/92 |
| 4,668,100 A | 5/1987 | Murakami et al. | |
| 4,672,565 A | 6/1987 | Kuno et al. | |
| 4,698,912 A * | 10/1987 | Fowler et al. ................. | 33/356 |
| 4,797,841 A * | 1/1989 | Hatch ........................... | 702/92 |
| 5,170,566 A * | 12/1992 | Fowler et al. ................. | 33/356 |
| 5,239,264 A * | 8/1993 | Hawks ........................ | 324/253 |
| 5,440,303 A | 8/1995 | Kinoshita | |
| 6,130,534 A * | 10/2000 | Huang et al. ................. | 324/202 |
| 6,173,501 B1 * | 1/2001 | Blank et al. ................... | 33/356 |
| 6,282,803 B1 | 9/2001 | Dunne | |
| 6,539,639 B2 | 4/2003 | Smith | |
| 6,543,146 B2 | 4/2003 | Smith et al. | |
| 6,831,457 B2 * | 12/2004 | Honkura et al. ............. | 324/249 |
| 6,964,107 B1 * | 11/2005 | Ahola ........................ | 33/356 |
| 2005/0183274 A1* | 8/2005 | Cho et al. ...................... | 33/356 |
| 2006/0190174 A1* | 8/2006 | Li et al. ...................... | 701/224 |

FOREIGN PATENT DOCUMENTS

| | | |
|---|---|---|
| JP | 09-325029 A | 12/1997 |
| KR | 2002-0030244 A | 4/2002 |

OTHER PUBLICATIONS

Japanese Abstract No. 2000009468.

* cited by examiner

Primary Examiner—R. Alexander Smith
(74) Attorney, Agent, or Firm—Sughrue Mion, PLLC

(57) ABSTRACT

A geomagnetic sensor which informs a user that information with respect to a distorted azimuth angle may be detected. The geomagnetic sensor includes a geomagnetism detection module including an X axis fluxgate and a Y axis fluxgate orthogonal to each other and detecting a predetermined amount of electrical signals corresponding to a geomagnetism of each of the fluxgates; a signal processing unit for converting the electrical signal output from the geomagnetism detection module to predetermined X axis and Y axis output values and outputting them; a display unit for displaying a predetermined warning message on a screen; and a control unit for determining whether the output values of the X and Y axes are distorted, and controlling the display unit to display the predetermined warning message upon determination that the output values are distorted. Accordingly, the possibility of a distorted azimuth angle may be detected and informed to a user.

17 Claims, 4 Drawing Sheets

GEOMAGNETIC SENSOR FOR INFORMING USERS WHETHER DETECTED AZIMUTH ANGLE IS ACCEPTABLE, AND A METHOD THEREOF

CROSS-REFERENCE TO RELATED APPLICATIONS

This application claims benefit under 35 U.S.C. § 119 from Korean Patent Application No. 10-2004-13068, filed on Feb. 26, 2004, the entire content of which is incorporated herein by reference.

BACKGROUND OF THE INVENTION

1. Field of the Invention

The present invention relates to a geomagnetic sensor and a method for measuring an azimuth angle using the same, and more particularly, to a geomagnetic sensor which informs a user that an error might be present in the azimuth angle information being currently measured upon determination that there is a change in a circumferential magnetic field environment, and a method for measuring the azimuth angle using the same.

2. Description of the Related Art

A geomagnetic sensor operates to measure intensity and direction of a terrestrial magnetism which a human can not perceive, and in particular, a sensor which operates to measure the geomagnetism using a fluxgate is called a fluxgate type geomagnetic sensor.

The fluxgate type geomagnetic sensor employs as its magnetic core a material such as a permalloy having a high permeability, wherein an exited magnetic field is applied through a driving coil which is wound on the core to measure secondary harmonic components proportional to an external magnetic field generated in response to the magnetic saturation and the non-linearity magnetic characteristics of the core, thereby allowing the intensity and the direction of the external magnetic field to be measured.

Such a fluxgate type was developed in the late 1930s, and provides several advantages such as it has an economical property, a good sensitivity, and can be relatively small-sized as compared to other kinds of geomagnetic sensors. In addition, it also has advantages in that it consumes less power and provides a long-term stability of its output signal, so that it is widely employed for civilian and military purposes ranging from weak magnetic field detection, measurement of terrestrial absolute direction to exploration of a vein of ore, target detection, positional control of an artificial satellite, and space probing, and research for enhancing its performance have been continuously conducted. In particular, since a Micro Electro Mechanical System (MEMS) technique has been gradually developed in recent years, a very small-sized fluxgate type geomagnetic sensor consuming low power by means of the MEMS technique may be fabricated, and is also built in various portable electronic devices such as a mobile phone, a Personal Digital Assistant (PDA), a notebook, a Personal Computer (PC) or the like.

FIG. 1 is a schematic diagram showing an internal configuration of a typical geomagnetic sensor including two axis fluxgates for detecting geomagnetism. Referring to FIG. 1, the geomagnetic sensor 10 includes an X-axis fluxgate 11 and a Y-axis fluxgate 13. Each of the X and Y axis fluxgates 11 and 13 has a rectangular or bar-shaped magnetic core, a driving coil which is wound on the core, and a detection coil. The driving coil operates to excite and magnetize the magnetic core by receiving an external electrical signal, and the detection coil operates to detect an electromotive force which is induced from the magnetism generated from the drive of the driving coil.

A control unit (not shown) of the geomagnetic sensor 10 uses both output values of the X and Y fluxgates 11 and 13 to calculate a current azimuth angle by means of predetermined formulae.

FIG. 1 also shows three axes which are references for measuring a pitch angle, a roll angle, and a yaw angle of the geomagnetic sensor 10. The pitch angle and the roll angle indicate rotational angles with respect to a horizontal plane on which the geomagnetic sensor 10 is positioned when the geomagnetic sensor is rotated based on each of two axes thereof. The yaw angle indicates a rotational angle measured when the geomagnetic sensor 10 is rotated around the axis vertical to the plane on which the geomagnetic sensor 10 is positioned.

It is determined that the geomagnetic sensor 10 is inclined at a predetermined angle when at least one angle of the pitch angle and the roll angle of the geomagnetic sensor 10 is not zero degree, so that the output values of the X and Y axis fluxgates 11 and 13 may be distorted due to such an inclination. As a result, the azimuth angle which was calculated using the distorted output values may be distorted.

A tilt compensation algorithm for compensating the inclination effect is known in the related art, however, additional information with respect to the current inclination (the pitch angle, the roll angle), a magnetic dip or the like of the geomagnetic sensor 10 are required in order to carry out the tilt compensation algorithm. As a result, additional hardware, such as an acceleration sensor capable of measuring the pitch angle and the roll angle, is required. Accordingly, such a geomag has difficulty in allowing the sensor to be built in various portable electronic devices which should be implemented in very small-sized shapes.

In addition, when the azimuth angle is measured using the geomagnetic sensor 10 under an environment having a circumferentially strong magnetic field, the information with respect to the distorted azimuth angle may be detected even at a horizontal state (namely, the pitch angle=the roll angle=zero degree).

However, the geomagnetic sensor of the related art is unable to recognize that the azimuth angle information is normal or distorted even when the azimuth angle measured by the related art might be distorted. As a result, a user must determine whether he/she should accept the measured azimuth angle or compensate for the geomagnetic sensor in the current position by determining the azimuth angle again.

SUMMARY OF THE INVENTION

It is therefore one object of the present invention to provide a geomagnetic sensor which determines whether there is a change in the circumferential magnetic field environment and informs the user that an error might be present in the azimuth angle information which is currently calculated and displayed, and a method for measuring the azimuth angle using the same.

According to one exemplary embodiment of the present invention, there is provided a geomagnetic sensor, which comprises: a geomagnetism detection module including an X axis fluxgate and a Y axis fluxgate orthogonal to each other and detecting a predetermined amount of electrical signals corresponding to a geomagnetism of each of the fluxgates; a signal processing unit for converting the electrical signal output from the geomagnetism detection module to predetermined X axis and Y axis output values and outputting them; a display unit for displaying a predetermined warning message on a screen; and a control unit for determining whether the output values of the X and Y axes are distorted, and controlling the display unit to display the predetermined warning message upon determination that the output values are distorted.

In this case, the control unit may normalize the output values of the X and Y axes to values in a predetermined tolerable range, square each of the normalized output values, and add them together, so that it may determine whether the resultant value is in the predetermined tolerable range. In other words, the control unit determines that at least one of the output values of the X and Y axes is distorted when the resultant value is out of the predetermined tolerable range.

In the meantime, the control unit carries out the normalization by mapping the output values of the X and Y axes to values in a constant range by means of predetermined formulae.

As a result, maximum output value and minimum output value information of each of the X and Y axis fluxgates needed for the normalization are detected and stored by means of pre-compensation so that the control unit may use the information.

Accordingly, the present geomagnetic sensor may preferably further comprise a memory for storing the information about the maximum output value and the minimum output value of each of the X and Y axis fluxgates.

According to another exemplary embodiment of the present invention, there is provided a method for measuring an azimuth angle of a geomagnetic sensor having an X axis fluxgate and a Y axis fluxgate orthogonal to each other, which comprises: (a) detecting predetermined output values of the X and Y axes corresponding to a geomagnetism from the X and Y axis fluxgates; (b) determining whether the output values of the X and Y axes are distorted; and (c) displaying a predetermined warning message upon determination that at least one of the output values of the X and Y axes is distorted.

In this case, the (b) step may preferably include: squaring each of the normalized output values of the X and Y axes and adding them together to detect a predetermined resultant value; determining whether the resultant value is in a predetermined tolerable range; and determining that at least one of the output values of the X and Y axes is distorted when the resultant value is out of the tolerable range.

In addition, the method for measuring the azimuth angle of the geomagnetic sensor in accordance with the present invention may preferably further comprise applying the normalized output values of the X and Y axes to the formula $\psi=\tan^{-1}(Y/X)$ to calculate an azimuth angle $\psi$.

BRIEF DESCRIPTION OF THE DRAWINGS

The above aspects and features of the present invention will be more apparent by describing certain preferred embodiments of the present invention with reference to the accompanying drawings, in which.

DETAILED DESCRIPTION OF THE PREFERRED EMBODIMENTS

Hereinafter, the present invention will be described in detail with reference to illustrative accompanying drawings.

Figure 1:
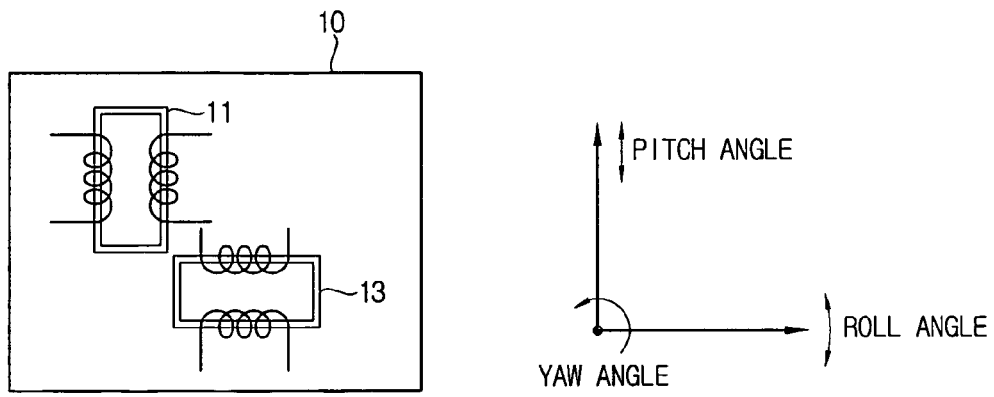
FIG. 1 is a schematic diagram showing an internal configuration of a typical two axis fluxgate type geomagnetic sensor.
Figure 2:
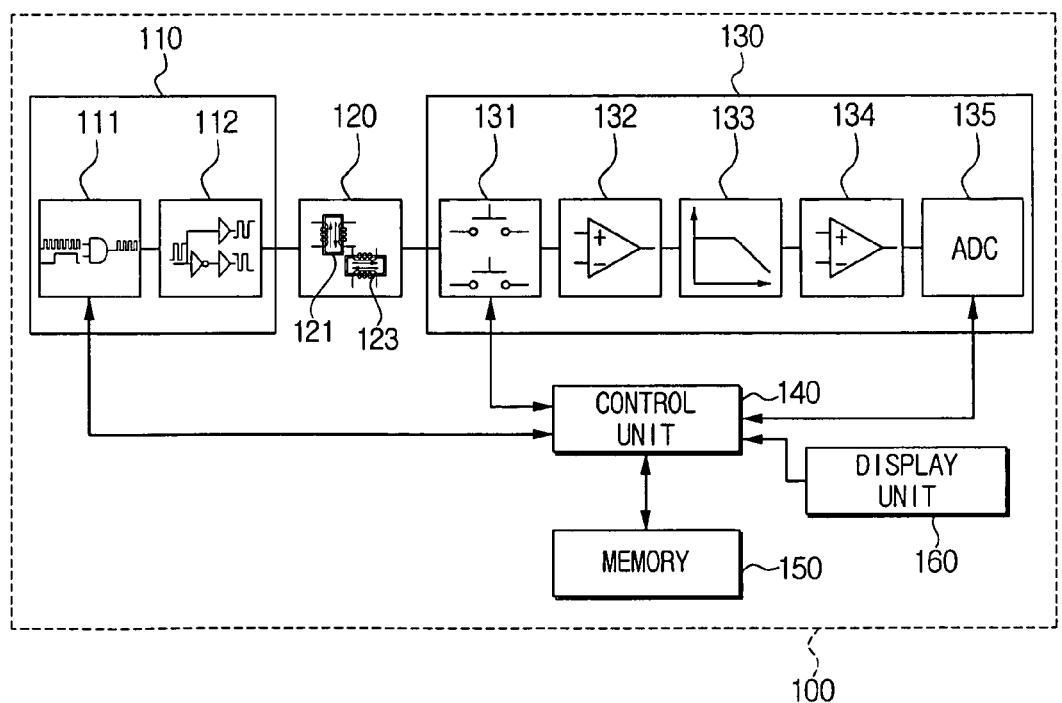
FIG. 2 is a block diagram showing an internal configuration of a geomagnetic sensor in accordance with one embodiment of the present invention.

FIG. 2 is a block diagram showing an internal configuration of a geomagnetic sensor 100 in accordance with one exemplary embodiment of the present invention.

Referring to FIG. 2, the present geomagnetic sensor 100 includes a driving signal generation unit 110, a geomagnetism detection module 120, a signal processing unit 130, a control unit 140, a memory 150, and a display unit 160.

The driving signal generation unit 110 operates to generate and output a driving signal for driving the geomagnetism detection module 120. According to one embodiment of the present invention, the driving signal generation unit 110 includes a pulse generator (no shown), a pulse limiting unit 111, and a pulse amplifying unit 112. When pulse waves are output from the pulse generator, the pulse limiting unit 111 selectively carries out switching of the output pulse waves, and applies a pulse wavelength and an inverted pulse wavelength as the driving signals by amplifying and inverting the pulse wave.

An And-gate may be used as the pulse limiting unit 111, which outputs the pulse output from the pulse generator in accordance with the control signal applied at one end of the And-gate. In the meantime, the pulse amplifying unit 112 uses several amplifiers and inverters to apply to the geomagnetism detection module 120 two pulse signals which have phases opposite to each other with respect to the pulse output from the pulse limiting unit 111.

The geomagnetism detection module 120 operates to output a predetermined electrical signal corresponding to the magnetism when the driving signal is applied from the driving signal generation unit 110. Referring to the X and Y axis fluxgates 121 and 123 shown in FIG. 2, the driving coil and the detection coil are wound on the rectangular shaped magnetic core of the two fluxgates, respectively. As described above, when the driving signal is applied to each driving coil, a magnetism occurs to the X and Y axis fluxgates 121 and 123, which in turn allow the induced electromotive force to be detected by the detection coil.

In the meantime, the X and Y axis fluxgates 121 and 123 within the geomagnetism detection module 120 are fabricated to be perpendicular to each other. In this case, each of the X and Y axis fluxgates 121 and 123 may be displaced in any directions required by the manufacturer. By way of example, referring to FIG. 2, the geomagnetism detection module 120 is shown, wherein the X-axis fluxgate 121 is positioned in an up-and-down orientation and the Y-axis fluxgate 123 in a left-and-right orientation.

The signal processing unit 130 operates to convert the electrical signal (i.e., the induced electromotive force) detected from each of the X and Y axis fluxgates 121 and 123 to a predetermined digital value through a constant procedure, and to output the digitized value. According to one exemplary embodiment of the present invention, the signal processing unit 130 includes a chopping circuit 131, a first amplifier 132, a filter 133, a second amplifier 134, and an A/D converter 135. The chopping circuit 131 controls several built-in switches to chop the electrical signal output from the geomagnetism detection module 120. The chopped electrical signal is differentially amplified by the first amplifier 132 and filtered out by the filter 133 to have the signal present only in a predetermined range which is in turn amplified by the second amplifier 134. The amplified signal is converted by the A/D converter 135 to a digital voltage value so that it is output as an output value for each of the X and Y axes.

In the meantime, the control unit 140 carries out a normalization procedure of mapping the actual output value output from the signal processing unit 130 to a predetermined range. To this end, a manufacturer of the geomagnetic sensor 100 may in advance carry out a compensation process of measuring the maximum output value and the minimum output value of the geomagnetic sensor 100. In other words, the output values of the X and Y axis fluxgates 121 and 123 are measured while the geomagnetic sensor 100 is rotated at least one time in a horizontal state. When the measurement is completed, the minimum and the maximum values among the measured output values are selected. The memory 150 operates to store the selected minimum and the maximum output values of each of the X and Y axis fluxgates 121 and 123.

The manufacturer of the geomagnetic sensor 100 having a jig allowing the geomagnetic sensor to be rotated in a correct angle while the sensor maintains its horizontal state preferably carries out the compensation process and records the compensation in advance. The user may carry out a new compensation process at will when the new compensation process is required in response to a new environment.

The control unit 140 carries out the normalization by substituting parameters of the formula below with the maximum and the minimum values recorded on the memory 150 and the X and Y axis output values detected from the signal detection unit 130.

$$nX = \frac{(X - X_{bias})}{X_{scale}}, X_{bias} = \frac{(X_{max} + X_{min})}{2},$$
$$X_{scale} = \frac{(X_{max} - X_{min})}{2}$$
$$nY = \frac{(Y - Y_{bias})}{Y_{scale}}, Y_{bias} = \frac{(Y_{max} + Y_{min})}{2},$$
$$Y_{scale} = \frac{(Y_{max} - Y_{min})}{2}$$

Formula 1

Referring to the formula 1, X and Y indicate the output values of the X and Y axis fluxgates 121 and 123, respectively, nX and nY indicate the normalization values of the X and Y axes, respectively, Xmax and Xmin indicate the maximum and the minimum values of the X axis, respectively, and Ymax and Ymin indicate the maximum and the minimum values of the Y axis, respectively. The control unit 140 uses the Xmax, Xmin, Ymax, and Ymin for the formula 1 which were measured and recorded in the memory 150, and calculates the Xbias, Xscale, Ybias, and Yscale, and uses the resultant values to calculate nX and nY.

In the meantime, the control unit 140 determines whether the normalized output value of each of the X and Y axes is distorted. As a result, the control unit 140 controls the display unit 160 to inform the user that the azimuth information being calculated and output might have an error upon determination that it is distorted. The display unit 160 may inform the user of the fact by means of a certain Liquid Crystal Display (LCD) screen, a Light Emitting Diode (LED) or the like.

In the meantime, the procedure for the control unit 140 to determine whether the normalized output value of each axis is distorted is as follows. To detail this, the control unit 140 has each of the normalized X axis output value (hereinafter, it will be referred to as an nX) and the normalized Y axis output value (hereinafter, it will be referred to as an nY) squared and added together, and determines whether the added value is in a predetermined tolerable range. It determines that the normal azimuth information is calculated when the resultant value is within the tolerable range, and determines that each output value of the axes is distorted when the resultant value is outside of the tolerable range.

Figure 3A:
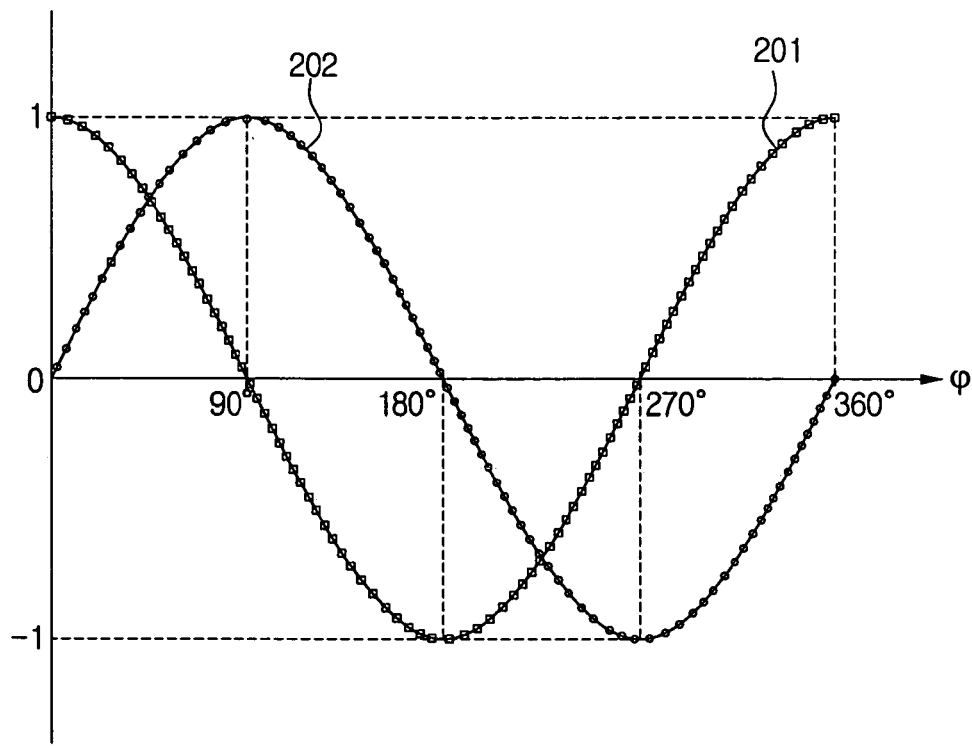
FIG. 3A is a graph showing X-axis and Y-axis output values of the geomagnetic sensor shown in FIG. 2.

When the normalization procedure is carried out using the formula 1, the X and Y axis output values of the geomagnetic sensor 100 represent the cosine waveform 201 and the sine waveform 202 as shown in FIG. 3A, respectively. Referring to FIG. 3A, it can be seen that each of the axis output values is normalized in a range of ±1.

Figure 3B:
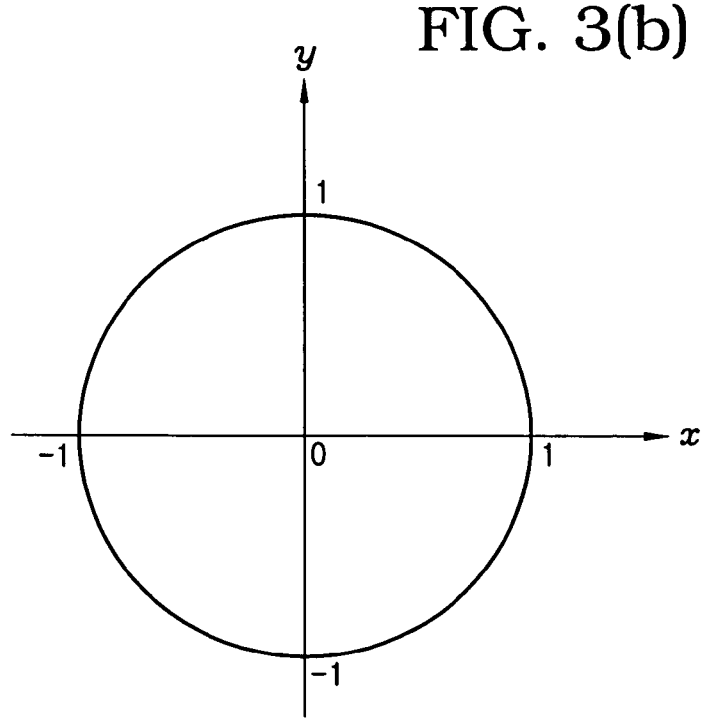
FIG. 3B is a graph showing a correlation between the X-axis and the Y-axis output values of the geomagnetic sensor shown in FIG. 2.

In the meantime, FIG. 3B is a graph showing the correlation between the X-axis and the Y-axis output values which are normalized in a range of ±1. In other words, the X and Y axis output values are represented as the cosine function value and the sine function value, respectively, so that its correlation may be expressed as the following formula 2.

Formula 2

$$(nX)^2 + (nY)^2 = \alpha, nX = \cos(\psi), nY = \sin(\psi)$$

Referring to the formula 2, nX and nY indicate the normalized X and Y axis output values, respectively, α is a calculated value, and ψ is an azimuth angle.

Accordingly, when nX and nY are cosine and sine function values in a range of ±1, respectively, α which is the calculated value of the formula 2 becomes "1", and a resultant circle having a radius of 1 is graphically shown as FIG. 3B.

In the meantime, the user may use the geomagnetic sensor 100 in various places, so that the azimuth angle may be detected in an inclined state or in an environment other than the magnetic field environment in which the user has carried out the compensation procedure of the geomagnetic sensor 100. As a result, the X and Y axis output values are distorted due to the circumferential magnetic field or the inclination, so that the unit circle (which is a circle having a radius of "1") as shown in FIG. 3B is not obtained. In other words, when each of the distorted X and Y axis output values is squared and added together, the resultant value α does not become 1.

Figure 4A:
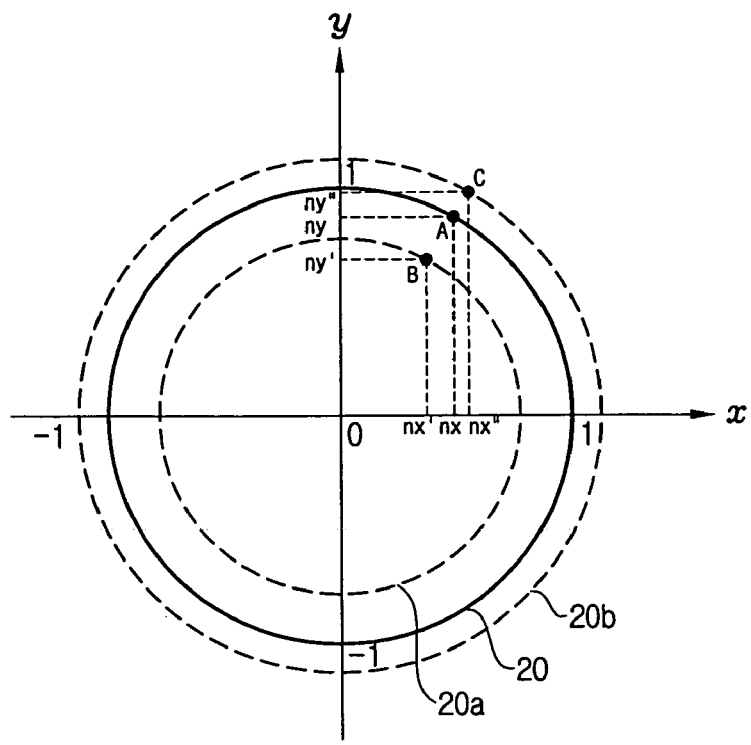
FIGS. 4A and 4B are graphs showing distortion phenomena of output values of a geomagnetic sensor in response to environmental changes.
Figure 4B:
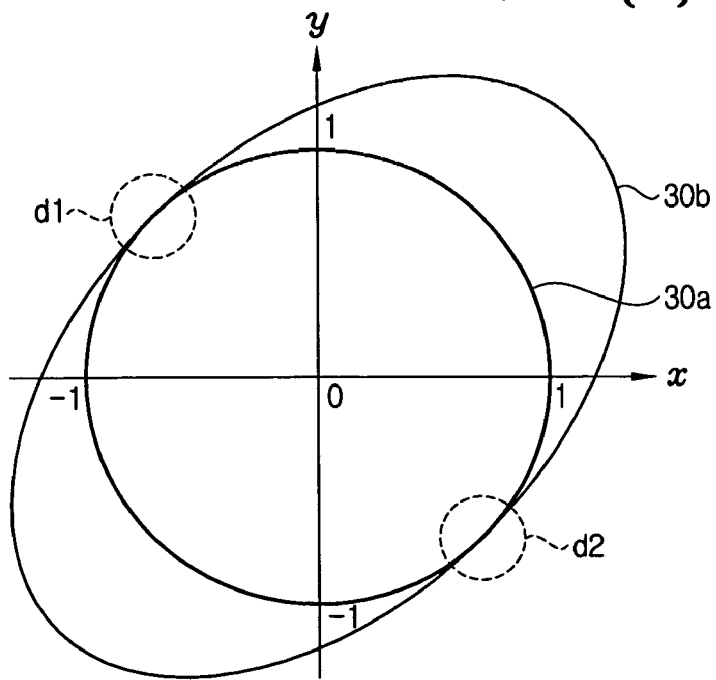

FIG. 4A and 4B are graphs showing respectively the correlation of the X and Y axis output values when α is not 1. First, FIG. 4A shows the graph that the X and Y axis output values are measured in a horizontal state but in the magnetic field environment other than the environment in which the compensation is carried out. Referring to FIG. 4A, the graph 20 shows the relation of the X and Y axis output values in the environment in which the compensation is carried out, wherein each output value of the X and Y axes is normalized in a range of ±1 so that the sum of the respective squared output values becomes 1, which in turn shows the unit circle. When the circumferential magnetic field environment is changed from the environment in which the compensation is carried out, the range of the minimum value and the maximum value of each output value of the X and Y axes is also changed, so that each of the relationship graphs 20a and 20b represents a circles having a radius other than 1 in each state.

In other words, when the X and Y axis output values are measured at a predetermined angle, A(nX, nY) is detected according to the relationship graph 20 in the same magnetic field environment as the environment in which the compensation is carried out, however, B(nX', nY') is detected due to each reduced amplitude of the output values of the X and Y axes in an area having a weak geomagnetism, and C(nX", nY") is detected due to each increased amplitude of the output values of the X and Y axes in an area having a circumferentially strong geomagnetism.

In the meantime, FIG. 4B corresponds to the same magnetic field environment, however, this figure shows the relationship graph of each output value of the X and Y axes detected while the geomagnetic sensor 100 is inclined. Referring to FIG. 4B, the relationship graph in the compensation environment shows the unit circle 30a, however, it shows an elliptical shape 30b when the geomagnetic sensor is inclined. As a result, each output value of the X and Y axes is distorted to be detected except the specific areas d1 and d2 where the unit circle 30a and the elliptical shape 30b are overlapped with each other. In the meantime, a correct azimuth angle may be detected when it is measured by chance in these areas d1 and d2, however, it is reasonable that the azimuth angle information generally has an error.

As a result, referring to FIG. 4A and 4B, α becomes 1 in the environment in which the compensation is carried out, however, it is detected as a value other than 1 when the geomagnetic field environment changes or the inclination occurs. In this case, in order to check the fact that the azimuth angle information of the geomagnetic sensor 100 is distorted in the environment in which the geomagnetic sensor 100 is just inclined, an additional separate sensor such as an acceleration sensor, gyro sensor or the like is employed to recognize the inclined position, and the control unit 140 may control the display unit 160 for displaying that the azimuth angle information to be output may have an error.

Accordingly, the control unit 140 recognizes that the current output values of the X and Y axes are distorted when the calculated value α is not 1. As a result, it determines that the azimuth angle information to be finally calculated may have an error. The control unit 140 may determine that the final azimuth angle is generally correct when it is within a tolerable range although α is not exactly 1.

In order to set the tolerable range, the manufacturer of the geomagnetic sensor 100 may check the constant range of α in which the tolerable azimuth angle information is obtained through a pre-test. Accordingly, the range of α is set as the tolerable range so that it may be stored in the memory 150. As a result, when the control unit 140 determines that the calculated value after each output value of the X and Y axes actually detected is squared and added together is within the tolerable range, it may determine that a correct azimuth angle is generally detected. By way of example, when the tolerable range is set to ±0.3 and the calculated values after each output value of the X and Y axes is applied to the formula 2 is approximately in a range of 0.7 to 1.3, the control unit determines that the azimuth angle information has no error.

When it is determined that the azimuth angle information is outside of the tolerable range, the control unit 140 controls the display unit 160 for displaying that the azimuth angle information to be output may have an error. Accordingly, the user may calculate a new scale factor and a new bias factor after he/she carries out a new compensation procedure to measure the maximum value and the minimum value of each output value of the X and Y axes.

Figure 5:
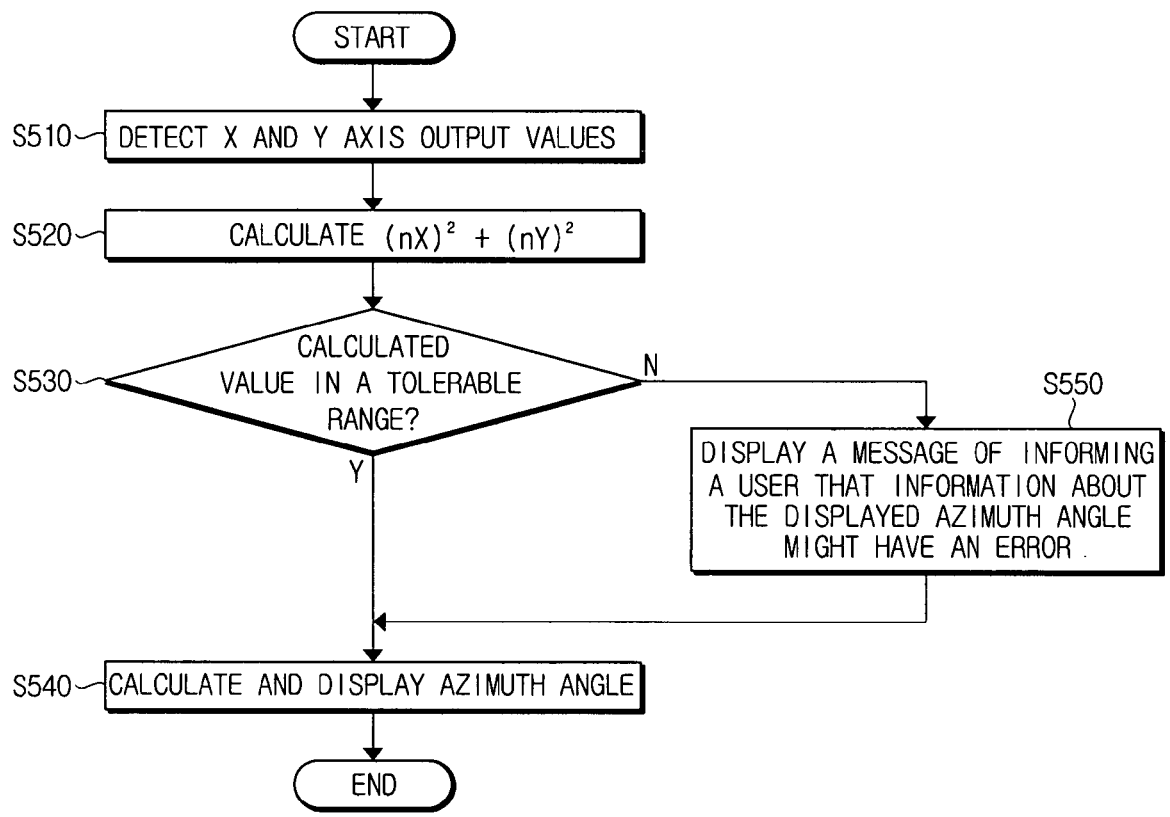
FIG. 5 is a flow chart for explaining a method for measuring an azimuth angle of a geomagnetic sensor in accordance with one embodiment of the present invention.

FIG. 5 is a flow chart for explaining a method for measuring the azimuth angle of a geomagnetic sensor in accordance with an exemplary embodiment of the present invention. When the user inputs a command of measuring the azimuth angle into the geomagnetic sensor 100, the driving signal generation unit 110 applies a driving signal to the geomagnetism detection module 120, and the resultantly detected electrical signals pass through the signal processing unit 130 so that they are detected as predetermined output values of the X and Y axes (step S510).

The control unit 140 applies the detected output values of the X and Y axes to the formula 1 and carries out the normalization, and uses the formula 2 to calculate α (step S520).

The control unit 140 determines whether the calculated value α of the formula 2 is in the tolerable range (step S530). Upon determination that it is in the tolerable range, the control unit does not have the above-mentioned warning message displayed but calculates the azimuth angle to be displayed (step S540). In the meantime, the azimuth angle ψ may be calculated using the formula of ψ=tan$^{-1}$(output value of axis/output value of Y axis/output value of X axis), because the output values of the X and Y axes are cos(ψ) and sin(ψ), respectively.

When it is determined in step S530 that the calculated value is out of the tolerable range, the control unit 140 may control the display unit 160 for displaying the warning message that the azimuth angle information to be displayed may have an error (step S550). In this case, after the display unit displays the warning message, the control unit may have even the azimuth angle information which has a possibility of including an error displayed (step 540). Accordingly, the user may use the azimuth angle as it is if for example when he/she determines that the error is not significant.

Alternatively, when the user recognizes the warning message, he/she preferably carries out the compensation procedure by newly rotating the geomagnetic sensor 100 one time at the current position to detect the correct azimuth angle information having no error.

In accordance with the exemplary embodiments of the present invention as mentioned above, it is determined whether the azimuth angle information which is currently measured is acceptable, and the user is informed when the information has a high possibility of including the error, so that the geomagnetic sensor may be newly compensated. In particular, the two axis fluxgates may be simply employed to determine whether there might be an error, so that there are no hardware limitations.

The foregoing embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art. As one example, instead of a display unit for displaying a predetermined warning message upon determination that an output value may be distorted, other types of warning mechanisms may be employed, such as an audible warning and/or a vibrating warning signal. Also, instead of a warning message, a simple warning light may be displayed to the user.

What is claimed is:

1. A geomagnetic sensor, comprising:
a geomagnetism detection module including an X axis fluxgate comprising a first magnetic core and a Y axis fluxgate comprising a second magnetic core and detecting a geomagnetism of the X axis fluxgate when the X axis fluxgate is driven by a first signal and a geomagnetism of the Y axis fluxgate when the Y axis is driven by a second signal;
a signal processing unit for converting signal outputs from the geomagnetism detection module to X axis and Y axis output values; and
a control unit for determining whether the output values of the X and Y axes are distorted, and providing a warning message upon determination that at least one of the output values is distorted.

2. The geomagnetic sensor as recited in claim 1, wherein the control unit normalizes the output values of the X and Y axes to values in a predetermined tolerable range, and determines that at least one of the output values of the X and Y axes is distorted when each of the normalized output values which is squared and together is out of the predetermined tolerable range.

3. The geomagnetic sensor as recited in claim 2, wherein the control unit normalizes the output values of the X and Y axes using the following formulae:

$$nX = \frac{(X - X_{bias})}{X_{scale}}, X_{bias} = \frac{(X_{max} + X_{min})}{2}, X_{scale} = \frac{(X_{max} - X_{min})}{2}$$

$$nY = \frac{(Y - Y_{bias})}{Y_{scale}}, Y_{bias} = \frac{(Y_{max} + Y_{min})}{2}, Y_{scale} = \frac{(Y_{max} - Y_{min})}{2}$$

wherein X and Y indicate the output values of the X and Y axes, respectively, nX and nY indicate the normalization values of the X and Y axes, respectively, Xmax and Xmin indicate maximum and minimum values of the X axis, respectively, and Ymax and Ymin indicate maximum and minimum values of the Y axis, respectively.

4. The geomagnetic sensor as recited in claim 3, wherein the control unit applies the normalized output values of the X and Y axes to the following formula to calculate an azimuth angle $\psi$:

$$\psi = \tan^{-1}(Y/X)$$

wherein X and Y are normalized output values of the X and Y axes, respectively, and $\psi$ is an azimuth angle.

5. The geomagnetic sensor as recited in claim 1, further comprising:
a memory for storing information about a maximum output value and a minimum output value of each of the X and Y axis fluxgates.

6. The geomagnetic sensor as recited in claim 1, wherein the X axis and Y axis fluxgates are orthogonal to each other.

7. The geomagnetic sensor as recited in claim 1, further comprising a display unit;
wherein said control unit is operable to control said display unit to display a predetermined warning message upon determination that at least one of the output values is distorted.

8. The geomagnetic sensor as recited in claim 1, wherein the first signal is inverted with respect to the second signal.

9. The geomagnetic sensor as recited in claim 1, wherein the first signal has an opposite phase with respect to the second signal.

10. A method for measuring an azimuth angle of a geomagnetic sensor having an X axis fluxgate and a Y axis fluxgate, comprising:
(a) detecting X axis output values corresponding to a geomagnetism from the X axis fluxgate when the X axis fluxgate is driven by a first signal;
(b) determining Y axis output values corresponding to a geomagnetism from the X axis fluxgate when the Y axis fluxgate is driven by a second signal;
(c) determining whether the output values of the X and Y axes is distorted; and
(d) providing a warning message upon a determination that at least one of the output values of the X and Y axes is distorted.

11. The method as recited in claim 10, further comprising:
normalizing the output values of the X and Y axes to values in a predetermined range by means of the formulae below:

$$nX = \frac{(X - X_{bias})}{X_{scale}}, X_{bias} = \frac{(X_{max} + X_{min})}{2}, X_{scale} = \frac{(X_{max} - X_{min})}{2}$$

$$nY = \frac{(Y - Y_{bias})}{Y_{scale}}, Y_{bias} = \frac{(Y_{max} + Y_{min})}{2}, Y_{scale} = \frac{(Y_{max} - Y_{min})}{2}$$

wherein X and Y indicate the output values of the X and Y axes, respectively, nX and nY indicate the normalization values of the X and Y axes, respectively, Xmax and Xmin indicate maximum and minimum values of the X axis, respectively, and Ymax and Ymin indicate maximum and minimum values of the Y axis, respectively.

12. The method as recited in claim 11, wherein the determining (c) includes:
squaring each of the normalized output values of the X and Y axes and then adding them together to detect a resultant value;
determining whether the resultant value is within a predetermined tolerable range; and
determining that at least one of the output values of the X and Y axes is distorted when the resultant value is out of the predetermined tolerable range.

13. The method as recited in claim 12, further comprising:
applying the normalized output values of the X and Y axes to the following formula to calculate an azimuth angle $\psi$:

$$\psi = \tan^{-1}(Y/X)$$

wherein X and Y are normalized output values of the X and Y axes, respectively, and $\psi$ is an azimuth angle.

14. The method as recited in claim 10, wherein the X axis fluxgate is orthogonal to the Y axis fluxgate.

15. The method as recited in claim 10, wherein the warning signal is displayed upon the determination that at least one of the output values of the X and Y axes is distorted.

16. The method as recited in claim 10, wherein the first signal is inverted with respect to the second signal.

17. The method as recited in claim 10, wherein the first signal has an opposite phase with respect to the second signal.

* * * * *